United States Patent Office 2,910,457
Patented Oct. 27, 1959

2,910,457

COPOLYAMIDE OF 4-AMINOMETHYL-CYCLO-HEXYL CARBOXYLIC ACID

Samuel C. Temin, Cleveland, and Max Levine, Cleveland Heights, Ohio, assignors to Industrial Rayon Corporation, Cleveland, Ohio, a corporation of Delaware No Drawing. Application December 4, 1956
Serial No. 626,092

5 Claims. (Cl. 260—78)

This invention relates to the production of polymeric materials and, more particularly, to the production of certain linear copolymers which are capable of being formed into shaped articles such as fibers, filaments, films and the like, hereinafter referred to as fibers.

Polymers produced from the self-condensation of epsilon-caprolactam or epsilon-aminocaproic acid are well-known as commercially important products. The shaped articles derived from such polycaproamides possess high strength and a marked resistance to moisture, solvents, mildew, etc. However, various attempts have been made to produce modified polycaproamides of greater utility by raising the melting point of the polymer and increasing the resilience of the fibers derived therefrom. Attempts to improve these properties by copolymerization in general have been unsuccessful. Thus, copolymers of caprolactam and minor amounts of other polyamide-forming monomers are almost always found to have melting points lower than the melting point of either homopolymer alone and also possess increased solubility. This is true whether the two monomers are polymerized together or whether the two homopolymers are separately polymerized and then mixed and heated until a true interpolymer results. These lower melting points of the copolymers are also always associated with an undesirable increase in solubility, a loss in crystallinity, and a loss in resilience and strength of the fibers obtained therefrom.

However, in accordance with the present invention, useful copolymers which do not exhibit the melting point depression phenomena may be produced by a process which comprises heating 4-aminomethylcyclohexyl carboxylic acid with a compound selected from the group consisting of epsilon-aminocaproic acid and epsilon-caprolactam.

It has also been found that homopolymers of this 4-aminomethylcyclohexyl carboxylic acid possess only minor utility due to the extreme melting point thereof. Thus the particular copolymers of the product invention possess properties which are markedly superior to either of the respective homopolymers.

The monomeric 4-aminomethylcyclohexyl carboxylic acid condensed with the caprolactam or the aminocaproic acid to produce the copolymers of the present invention may be prepared by a number of methods. One method of synthesis involves the reduction of 4-cyanobenzoic acid to produce 4-aminomethylcyclohexyl carboxylic acid in excellent yield. One may employ terephthalic acid to produce the para-cyanobenzoic acid. This may result in the formation of small amounts of 3-aminomethyl-cyclohexyl carboxylic acid if isophthalic or meta-cyano-benzoic acid is present in the starting material. However, it has been found that minor amounts up to about 10% by weight of the 3-isomer in the 4-aminomethyl-cyclohexyl carboxylic acid monomer do not have a detrimental effect on the copolymers.

The 4-aminomethylcyclohexyl carboxylic acid and the caprolactam or aminocaproic acid may be polymerized by heating the mixture to an elevated temperature at which condensation occurs. Advantageously, the temperature of condensation is between about 200° and 325° C. The condensation reaction is preferably performed in an inert atmosphere and if desired catalysts, e.g., phosphoric acid, para-toluene sulfonic acid, etc., and stabilizers, e.g., adipic acid, hexamethylene diamine, etc., may be included in the reaction mixture. The period of heating may vary from several minutes to about forty hours or more, and is dependent upon the degree of molecular weight desired and upon the molecular weight stabilizers employed in the reaction mixture. The use of catalysts, although not detrimental, is not required. The condensation may be conducted in the presence of water under pressure and subsequently at a subatmospheric pressure if desired.

The amount of 4-aminomethylcyclohexyl carboxylic acid condensed with the caprolactam or the aminocaproic acid may comprise between about 5% and 50% by weight of the reaction mixture with special advantages when the percentage is between about 15% and 35% by weight. As the amount of 4-aminomethylcyclohexyl carboxylic acid is increased in the copolymers, there are increases in the melting point of the copolymer and increases in the initial modulus of fibers formed therefrom. Copolymers containing more than about 50% 4-aminomethyl-cyclohexyl carboxylic acid have melting points well in excess of 300° C. and are highly viscous polymers. Since the melt spinning of polymers melting above 300° C. and possessing very high melt viscosities is extremely difficult, it is preferred that the copolymers contain less than about 50% of the 4-aminomethylcyclohexyl carboxylic acid.

This invention will be more fully described by the following examples although it is understood that the invention is not intended to be limited by these examples. In these examples "parts" and "percent" of materials is intended to mean parts and percent by weight.

*Example I*

A mixture of 9 parts caprolactam and 1 part 4-aminomethylcyclohexyl carboxylic acid was put into a glass tube fitted with gas inlet and outlet ports. The tube was placed in a silicone oil bath which was rapidly heated to 260° C. A slow stream of purified carbon dioxide was passed in the gas inlet during the polymerization. After 16 hours at 260° C. the tube was removed from the heating bath and the white, tough polymer recovered. On a melting point block the copolymer melted at 212° C., two degrees higher than a simultaneously measured sample of caprolactam homopolymer. The relative viscosity of a 1% solution of the polymer in 1:1 phenol-tetrachloroethane at 25° C. was 2.67 corresponding to an intrinsic viscosity of 1.21. The highly crystalline copolymer was remelted and while being maintained at a temperature of about 220° C. was extruded through an 0.35 inch diameter orifice to yield a strong white monofilament. The monofilament was stretched 5 times over godet wheels at 80° C. The resulting 84 denier material had a tenacity of 5.8 grams per denier and an elongation at break of 25%. The initial modulus, measured at 0.5% elongation according to the usual method of measurement using the Instron, was 17.4. A similarly processed caprolactam homopolymer sample (of similar denier and elongation) had an initial modulus at 0.5% elongation of 8.2.

*Example II*

A copolymer was prepared from a mixture of 7.5 parts caprolactam and 2.5 parts 4-aminocyclohexylcarboxylic acid according to the procedure of Example I. The white, tough product had a melting point of 220° C. and an intrinsic viscosity of 1.11. The product was extruded to form filaments which were stretched 4.5 times at 80° C. to yield highly resilient, tough fibers.

*Example III*

A copolymer was prepared according to the procedure of Example I with the following exceptions: A mixture of 5 parts caprolactam and 5 parts 4-aminomethylcyclohexyl carboxylic acid was heated at 260° C. for 3 hours and then heated at 300° C. for 4 more hours. The resulting copolymer had an intrinsic viscosity of 0.68. The copolymer was then heated an additional 2 hours at 300° C. under a pressure of 1 mm. of mercury to produce a copolymer having an intrinsic viscosity of 0.89. This copolymer could be extruded to form filaments which after stretching over godet wheels produced fibers having a tenacity of four grams per denier and an elongation at break of 35%. The initial modulus at 0.5% elongation was 39.6.

What is claimed is:

1. A process for preparing a linear polyamide suitable for the production of shaped articles which comprises heating between about 5% and 50% by weight of the reaction mixture of 4-aminomethylcyclohexyl carboxylic acid with a compound selected from the group consisting of epsilon-aminocaproic acid and epsilon-caprolactam to obtain a melt extrudable polymer.

2. A process for preparing a linear polyamide suitable for the production of shaped articles which comprises heating to a temperature between about 200° and 325° C. between about 5% and 50% by weight of the reaction mixture of 4-aminomethylcyclohexyl carboxylic acid with a compound selected from the group consisting of epsilon-aminocaproic acid and epsilon-caprolactam to obtain a melt extrudable polymer.

3. A process for preparing a linear polyamide suitable for the production of shaped articles which comprises heating in an inert atmosphere between about 5% and 50% by weight of the reaction mixture of 4-aminomethylcyclohexyl carboxylic acid with a compound selected from the group consisting of epsilon-aminocaproic acid and epsilon-caprolactam to obtain a melt extrudable polymer.

4. A melt extrudable linear polyamide suitable for the production of shaped articles produced by the condensation with heating of between about 5% and 50% by weight of the reaction mixture of 4-aminomethylcyclohexyl carboxylic acid with a compound selected from the group consisting of epsilon-aminocaproic acid and epsilon-caprolactam.

5. A process for preparing a linear polyamide suitable for the production of shaped articles which comprises heating to a temperature between about 200° and 325° C. in an inert atmosphere between about 15% and 35% by weight of the reaction mixture of 4-aminomethylcyclohexyl carboxylic acid with epsilon-caprolactam to obtain a melt extrudable polymer.

References Cited in the file of this patent

UNITED STATES PATENTS

| 2,500,317 | Lincoln | Mar. 14, 1950 |
| 2,585,163 | Pease et al. | Feb. 12, 1952 |
| 2,790,788 | Kamlet | Apr. 30, 1957 |

FOREIGN PATENTS

| 907,481 | France | July 2, 1945 |

OTHER REFERENCES

Beilstein: Handbuch der Org. Chem., vol. 14, 4th ed., 1931, pp. 304, 305.